April 21, 1970 — R. F. LYNCH — 3,507,942

METHOD OF BLOW-MOLDING A PLASTIC CLOSURE

Filed July 18, 1966

INVENTOR
R. F. LYNCH
BY Young & Quigg
ATTORNEYS

United States Patent Office 3,507,942
Patented Apr. 21, 1970

3,507,942
METHOD OF BLOW-MOLDING A PLASTIC CLOSURE
Robert F. Lynch, Wayne, N.J., assignor to Phillips Petroleum Company, a corporation of Delaware
Filed July 18, 1966, Ser. No. 565,862
Int. Cl. B29d 1/00, 23/03
U.S. Cl. 264—96                                 3 Claims

ABSTRACT OF THE DISCLOSURE

Process for the formation of a hollow, substantially enclosed container closure from thermoplastic material by blow-molding in a multisection mold having one section provided with a protruding mandrel to form container engaging means and the product resulting therefrom.

---

This invention relates to a process of blow-molding, and to the product produced by said blow-molding process.

In one aspect, the invention relates to a process of making a hollow, substantially enclosed, blow-molded plastic closure of any desired shape by expanding a parison of thermoplastic material within a closed mold.

In another aspect, the invention relates to a process of making a hollow, substantially enclosed, blow-molded plastic closure of any desired shape by extruding two sheets of thermoplastic material, pinching off said sheets in a closed mold, and expanding the pinched-off portion within the mold to form said plastic closure.

In still another aspect, the invention relates to a process of making a hollow, substantially enclosed, blow-molded plastic closure by continuously extruding tubular thermoplastic material, periodically pinching off said tubular material, forming an inwardly projecting depression in said pinched-off tubular material by means of a mandrel of suitable shape, enclosing said pinched-off parison and mandrel within a closed mold, and expanding said pinched-off parison within the mold to form said closure.

Those skilled in the art are familiar with processes for making closures by injection molding and thermoforming, or vacuum-forming, methods. However, neither of these methods is suitable for making a hollow, substantially enclosed closure of any desired shape.

It is an object of this invention to form such a closure by the method of blow-molding. It is also an object of this invention to form a hollow, substantially enclosed closure adapted to engage the mouth of a container.

Other objects, aspects and the several advantages of this invention will be apparent to one skilled in the art upon studying the drawings, specification and appended claims.

In accordance with the invention, a method is provided for forming a hollow, substantially enclosed closure from either a tubular parison or two sheets of thermoplastic material by expanding said material within a closed mold designed to produce a closure of desired shape. The hollow, substantially enclosed closure can have depressions therein adapted to engage the mouth of a container, such as a bottle, jar, or can. The depressions can have male or female threads formed integrally therewith, which are adapted to engage complementary threads at the mouth of a container.

Referring now to the drawings.

Figure 1:
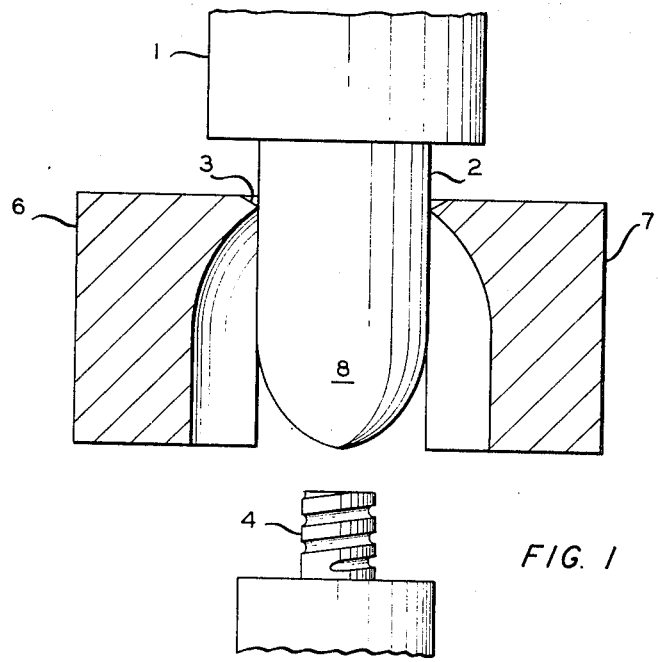
FIGURE 1 is illustrative of an apparatus suitable for an application of the concept of this invention.
Figure 2:
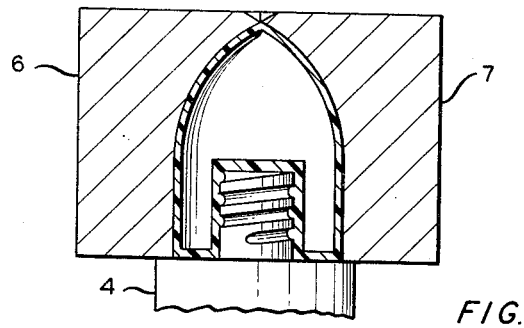
FIGURE 2 shows the formation of an inwardly-projecting depression in a parison adapted to engage the mouth of a container.

FIGURE 1 shows tubular, thermoplastic material 2 emerging from die head 1. The tubular material is pinched off by a suitable device 3 to form parison 8 which rotating mandrel 4 penetrates as shown in FIGURE 2. Mold halves 6 and 7 are moved to enclose the parison and mandrel, and air or other suitable fluid is forced into the parison to expand the parison against the walls of the mold halves by means of a needle (not shown). As shown in the drawings, the mandrel can have grooves formed in the area which penetrates the parison. During the blowing step, the surface of the inwardly-projecting depression will be forced into the grooves, thus forming male threads. In an alternate embodiment, the parison-penetrating portion of the mandrel can have male threads formed thereon, which results in the formation of female threads in the inwardly-projecting depression. It will be apparent to those skilled in the art that the mandrel may be rotated to disengage the finished closure, or the closure may be disengaged manually. In yet another embodiment, a single groove or bead can be formed on the surface of the inwardly-projecting depression to make a snap-on type closure.

Figure 3:
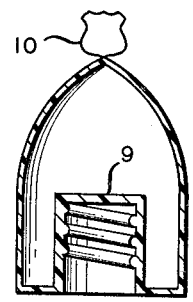
FIGURE 3 shows a blow-molded, hollow, substantially enclosed closure produced by the process illustrated in FIGURES 1 and 2.

FIGURE 3 shows a blow-molded, hollow, substantially enclosed closure with an inwardly-projecting depression having male threads formed integrally therewith. The inwardly-projecting depression terminates in a convex shaped, downwardly-projecting portion 9 which serves to seal the mouth of a container without the use of a separate gasket.

It is within the scope of the invention to provide vacuum ports in the mold halves to allow a vacuum to be drawn between the mold cavity and the outside of the parison in lieu of, or in addition to, forcing air into the inside of the parison. The main object is to introduce a dfferential pressure between the inside and outside of the parison to allow radial expansion.

The concept of the invention is applicable to the fabrication of any suitable thermoplastic material, including normally solid polymers and resins such as the polyolefins, particularly high-density polyethylene and polypropylene. In general, any solid polymer of an aliphatic mono-1-olefin can be used within the scope of this invention. Examples of such starting materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic closures having particularly desirable properties. The invention is also applicable to the lower-density polyolefins.

Other thermoplastic materials that can be used in the practice of the invention include the acrylonitrile-butadiene-styrene resins, cellulosics, copolymers of ethylene and a vinyl monomer with an acid group such as methacrylic acid, phenoxy polymers, polyamides, polycarbonates, vinyl copolymers and homopolymers and the like.

The shape and sizes of closures, and the kind of container-engaging means formed therein, produced in accordance with the invention can be widely varied. Shape and size can be determined by providing a mold of appropriate design. For example, a plug-type closure adapted to fit into, or over, a bottle neck, and adapted to engage the neck either frictionally or by means of female or male threads could be molded integrally with a top portion of any desired shape, such as round, oval, or square. In addition, such a closure could be adapted to engage the bottle neck by means of a combination friction-fit and positive engagement means. A closure of the latter type could, for example, slide onto the bottle neck and then snap over a bead or lip integral with said neck. In addition, pinch-off devices can be designed to form any desired configuration from the flash 10 at the pinch-off point, as shown in FIGURE 3.

EXAMPLE

An electrically heated, constantly running 1½ inch extruder was used in which the flow of the melt into the two horizontally opposed die heads was alternately directed by means of a valve. A linear polyethylene resin was used as feedstock. It had a melt index of about 0.9 (ASTM D1238–62T, Condition E) and a density of about 0.96 g./cc. The extruder barrel was maintained at a temperature profile from rear to front of 380, 400 and 420° F. The manifold and die heads were also kept at 420° F. The screw speed used was 78 r.p.m., a 30 gram parison was required to make the article, the over-all cycle time was 30 seconds and 60 p.s.i.g. air was used to blow the parison. A closure with molded threads and built-in sealing surface resulted.

I claim:
1. A method for making a one-piece, hollow, enclosed plastic closure having an inwardly projecting depression with container engaging means capable of effectively sealing a container without extra gaskets or liners, which method comprises:
   forming a closed end parison;
   positioning said closed end parison in a multi-sectioned mold having two opposing laterally movable sections, the closed end of said parison being positioned toward the open end of the mold with the two opposing sections closed;
   closing said opposing sections to pinch off the opened end of said parison and form a substantial portion of the mold cavity;
   moving a third mold section toward the open end of the two opposing sections so as to butt up against the two opposing movable sections and form the mold cavity, said third section being provided with a thread forming protruding mandrel so that upon closing the mold the mandrel engages and forces upwardly the closed end of said parison;
   introducing a gaseous blowing medium into said parison positioned within the closed mold to expand the parison to contact the walls of the mold and form said hollow closure with an inwardly projecting depression having container engaging means thereof; and
   opening the mold and removing the hollow closure from the protruding mandrel.

2. A method according to claim 1 wherein said closed end parison is formed from two sheets of a resinous thermoplastic polymer and wherein the two opposing movable sections of the mold move in a horizontal direction and said third section is moved vertically and is provided with a rotatable mandrel.

3. A method according to claim 1 wherein the closed end parison is a tubular parison of resinous thermoplastic polymer and wherein the two opposing movable sections of the mold move in a horizontal direction and said third section is moved vertically and is provided with a rotatable mandrel.

References Cited

UNITED STATES PATENTS

| | | | |
|---|---|---|---|
| 3,358,062 | 12/1967 | Lemelson | 264—96 |
| 1,786,483 | 12/1930 | Delany | 264—96 |
| 2,991,500 | 7/1961 | Hagen | 264—98 |
| 3,272,681 | 9/1966 | Langecker | 264—98 |
| 2,830,325 | 4/1958 | Bray | 264—331 |
| 3,318,985 | 5/1967 | Turner et al. | 264—96 |

FOREIGN PATENTS 1,164,639  3/1964  Germany.

ROBERT F. WHITE, Primary Examiner

R. SHEAR, Assistant Examiner

U.S. Cl. X.R.

18—5; 264—94